United States Patent
Said et al.

(10) Patent No.: US 10,061,788 B2
(45) Date of Patent: Aug. 28, 2018

(54) TRANSFORMATION OF DOCUMENT FLOW TO CONTRIBUTORS NETWORK

(71) Applicants: Bare Said, Sankt Leon-Rot (DE); Peter Eberlein, Malsch (DE)

(72) Inventors: Bare Said, Sankt Leon-Rot (DE); Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 837 days.

(21) Appl. No.: 14/134,835

(22) Filed: Dec. 19, 2013

(65) Prior Publication Data

US 2015/0178332 A1 Jun. 25, 2015

(51) Int. Cl.
*G06F 7/00* (2006.01)
*G06F 17/30* (2006.01)
*H04L 29/06* (2006.01)

(52) U.S. Cl.
CPC .. *G06F 17/30303* (2013.01); *G06F 17/30011* (2013.01); *G06F 17/30029* (2013.01); *G06F 17/30699* (2013.01); *H04L 63/102* (2013.01)

(58) Field of Classification Search
CPC ......... G06F 17/30303; G06F 17/30699; G06F 17/30029; G06F 17/30011
See application file for complete search history.

(56) References Cited

U.S. PATENT DOCUMENTS

| 8,613,108 B1* | 12/2013 | Aggarwal | H04L 63/101 455/411 |
| 2003/0046639 A1* | 3/2003 | Fai | G06Q 10/10 |
| 2010/0106551 A1* | 4/2010 | Koskimies | G06Q 10/10 156/1 |

OTHER PUBLICATIONS

"SAP® Business ByDesign™: Innovations and Key Capabilities," SAP Business ByDesign, copyright 2011, 34 pages.
"SAP® Business ByDesign™: Solution Functionality Overview," SAP Business ByDesign, copyright 2008, 32 pages.

* cited by examiner

*Primary Examiner* — Paul Kim
(74) *Attorney, Agent, or Firm* — Klarquist Sparkman, LLP

(57) ABSTRACT

Systems and methods are disclosed for processing data in an application platform. The method may include receiving at runtime a request for data about contributors to at least one document. Data may be determined for a set of contributors to the at least one document. The data for the set of contributors may be transformed based on at least one transformation rule. The transformed data for the set of contributors may be communicated in response to the request. The request may include context data indicating one or more of a user of a computing device, a user session of the computing device, a currently active application on the computing device, and an active screen of the computing device. The determining the data may include identifying, using at least some of the context data, a document associated with the currently active application.

14 Claims, 9 Drawing Sheets

TRANSFORMATION OF DOCUMENT FLOW TO CONTRIBUTORS NETWORK

BACKGROUND

As enterprises accumulate ever-greater amounts of data on their transactions, processes, products, and operations, online analytical processing has become an important part of doing business. The number of tools and techniques addressing analytical processing has grown, enabling data analysts to quickly analyze and navigate through vast and complex collections of data using processing software and platforms. Processing software systems use objects to represent real-world items used during the transaction of business. For example, a object may include logic and/or structured data, and may be used to represent a document, such as a sales order, a purchase order, an invoice, a product, a partner company, or equipment. The underlying structure of the object may be determined based on the requirements of the environment in which the object is to be used. In many instances, objects, such as documents in a document flow, include data that can be used in a variety of ways to facilitate understanding of the data by users/customers of the associated analytical processes. However, such data may be spread among many documents in the document flow, and its extraction and processing may be time-consuming and challenging.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an example aspect of the disclosure, a method for processing data in an application platform is disclosed and may include receiving at runtime a request for data about contributors. The request may be associated with a currently active application on a computing device and may also identify a user of the computing device. A plurality of documents associated with at least one document flow of the currently active application may be retrieved. Data for a set of contributors associated with the at least one document flow may be determined. The data for the set of contributors may be transformed based at least in part on access privileges of the user in the application platform. The transformed data for the set of contributors may be communicated to the computing device, in response to the request. The request may identify the currently active application and the retrieving may further include identifying the at least one document flow from a plurality of document flows based on the currently active application.

As described herein, a variety of other features and advantages can be incorporated into the technologies as desired.

DETAILED DESCRIPTION

Example 1—Exemplary Overview

Figure 1:
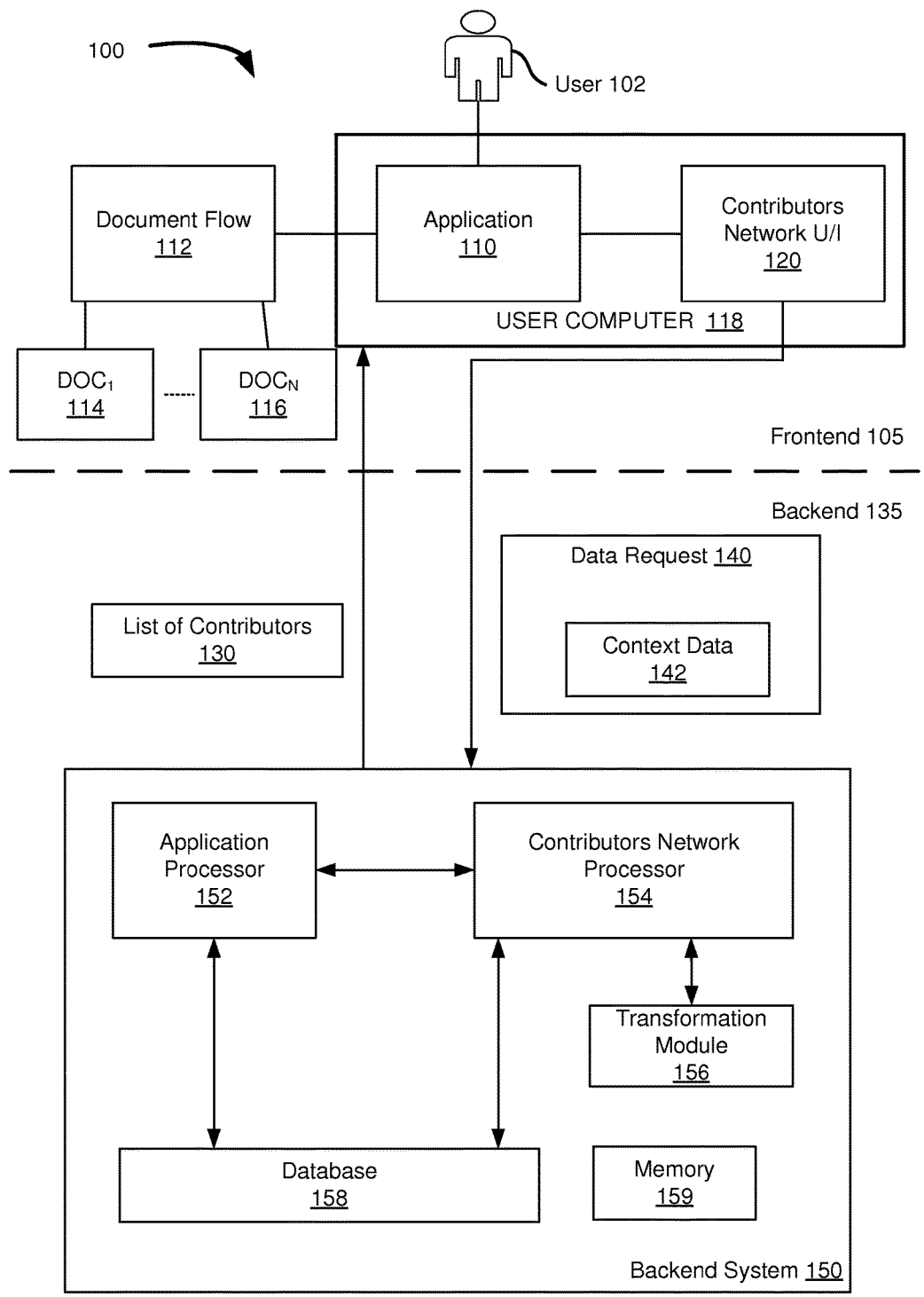
FIG. 1 is a block diagram of an example system for processing data in an application platform, in accordance with an example embodiment of the disclosure.

The technologies described herein can be used for processing data in an application platform in a variety of scenarios, such as using a document flow to extract and present information related to contributors associated with the document flow. In an example data processing environment, data may be structured in documents (e.g., a sales order or an invoice) that are linked to each other in a document flow, to reflect one or more processes in a process flow. The linked documents may be designed in a way that is primarily optimized to run automated processes in the data processing environment, with focus on data consistency and data integrity.

Using the technologies described herein, data encapsulated in linked documents (e.g., documents that are linked in a document flow), such as a customer quote, sales order, or invoice, may be transformed on the fly to present a view of a contributors network. For example, semantic information, such as contributor information, may be extracted from a plurality of documents in the document flow. The extracted contributor information may be further transformed and tailored to the end user role (e.g., user's position in a corporate organization structure) based on the end user's needs and authorizations (e.g., data access authorizations). The transformation may be executed based on a set of transformation rules that are dependent on the end user's role (e.g., based on the user's security clearance and data access privileges within an organization). Additionally, mapping, filtering and enrichment information contained in the transformation rules may enable the system to provide an end user with a tailored view of the contributors network, which view may match the end user's needs and authorizations.

As used herein, the terms "data" or "information content" (or "InfoContent") can include analytics data, such as created analytics reports, analytics, or other artifacts created by enterprise database suites (e.g., SAP's Crystal Reports, Lumira Datasets, WEBI reports, XCelcius reports, etc.). The data or information content can also be other, arbitrary content such as spreadsheets, images, documents in a document flow, user interfaces, web services, or the like.

As used herein, the term "database connection" (or simply a "connection") can include the connection established between a client device (e.g., an access terminal) and one or more database servers (i.e., database repositories) hosting at least one database. In this regard, a "database connection" may include information identifying a database (e.g., a server address and logon properties of a database), information identifying a subset of a database (e.g., fields, calculations, filters, groupings, or the like), information identifying a database query (or simply a "query"), and/or information identifying a data cube (or simply a "cube") (such identifying information may include a server address and a technical name of a cube). Each of the database connections may be associated with one or more fields, which may be used to further distinguish and/or classify the information content for a given database connection.

As used herein, the term "object" (or "business object") may represent real-world items used during the transaction of business, such as documents (e.g., a sales order, a purchase order, an invoice, etc.), a product, a partner company, a piece of equipment, and so forth. A business object may include business logic and/or data having any suitable structure, which may be based on the requirements of the business scenario in which the business object is to be used. For example, a business object (or a user interface for rendering data for business objects, or a web service for accessing data for business objects) may include a plurality of attributes (or data), where the attributes may be associated with access paths to the locations (e.g., database locations) storing the attributes' data. Each attribute may be associated with one or more backend data processing services used for querying, retrieving and manipulating the data.

As used herein, the term "metadata" means data about other data, and the term "analytics metadata" can include metadata associated with information content, as well as metadata associated with one or more locations hosting the information content. For example, for a given analytics report, the "analytics metadata" may include metadata associated with the report itself (e.g., title, author, date of creation, report fields, report columns, linked information sources, and the like), as well as metadata associated with the database connection for the analytics report (e.g., metadata associated with a database, a database query and/or a data cube used for accessing or hosting the analytics report). Additionally, analytics metadata for one category of database connections (e.g., a database) may be associated (e.g., linked) to analytics metadata associated with another database connection category (e.g., a query and/or a cube), and/or to analytics metadata associated with information content that is accessible via the database connection. Furthermore, analytics metadata may include information for one or more attributes (or data) associated with a meta object model as well as the access path (e.g., location to a node, a database or another data location) for accessing data associated with the attribute.

As used herein, the term "contributor" (e.g., to a document associated with a process or to a document flow associated with a process) refers to a person associated at least in part with designing at least part of the process, performing at least part of the process, managing at least part of the process, scheduling at least part of the process, reporting at least one result of the process, and/or communicating with a customer regarding at least part of the process. The contributor information may be part of (or extracted from) a document's semantic information, which may include one or more of "sold to party" information, "ship to party" information, "bill to party" information, "responsible employee" information, "sales representative" information, "contact person" information, "created by" information, "edited by" information, "project administrator" information, and/or "project manager" information.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

Example 2—Exemplary System Implementing Processing of Data Such as Transformation of Document Flow to Contributors Network FIG. 1 is a block diagram of an example system for processing data in an application platform, in accordance with an example embodiment of the disclosure. Referring to FIG. 1, the example system 100 may comprise a user computer 118 operating in the frontend 105 and a backend system 150 operating in the backend 135. The user 102 may use the user computer 118 to run an application 110, which may be, for example, a data processing application. The application 110 may implement a contributors network user interface (U/I) 120, which may be a U/I control embedded on one or more screens of the application 110.

The backend system 150 may comprise suitable circuitry, logic, and/or code and may be operable to receive and process requests from the application 110. The backend system may comprise an application processor 152, a contributors network processor 154, a transformation module 156, a database 158, and memory 159. The application processor 152 may comprise suitable circuitry, logic, and/or code and may be operable to process application-related requests (e.g., core service invocations) received from the application 110 running on the user computer 118. If an application-related request is a request for contributors data initiated by actuating a feature of the contributors network U/I 120, then such request may be passed on to the contributors network processor 154.

The contributors network processor 154 may comprise suitable circuitry, logic, and/or code and may be operable to process data requests for information about one or more contributors associated with at least one document. After obtaining contributors data, the contributors network processor 154 may use a transformation module 156 to transform the contributors data so that it is customized to the needs and access privileges of the user 102. Both the contributors network processor 154 and the application processor may be runtime engines. Additionally, the contributors network processor 154 may be implemented together with (or in some instances separately from) the application processor 152.

In operation, user 102 may use user computer 118 running application 110. The application 110 may be associated with a plurality of documents, such as 114, . . . , 116. At any given time, one or more of the documents 114, . . . , 116 may be active (e.g., open) at the computer 118. The documents 114, . . . , 116 may be associated with a document flow 112. While viewing a document that is currently open by the application 110 (e.g., document 114), the contributors network U/I 120 may be displayed to the user 102 (e.g., the U/I 120 may be embedded on the screen that is currently viewed).

When the end user 102 invokes a data request for contributor information, the data request (e.g., data request 140 for contributors network information) is passed to the application processor 152 and then onto the contributors network processor 154. The data request 140 may comprise context data 142, which may include information specific to the user 102 (e.g., user identification information, security clearance and data access restrictions, and so forth) and/or information identifying the application 110 running on the computer 118. The context data 142 may further identify, for example, a currently active screen of the application 110, one or more documents that are associated with the currently active screen (e.g., one or more of the documents 114, . . . , 116) and/or the document flow (e.g., 112) associated with the documents.

The contributors network processor 154 may use the context data 142 to determine the appropriate document (or documents, such as one or more of the documents 114, . . . , 116) that are associated with the currently active application 110. The documents 114, . . . , 116 and/or information about the document flow 112 may be stored in (and accessed from) the database 158 and/or the memory 159. The contributors network processor 154 may extract information about one or more contributors associated with at least one of the documents 114, . . . , 116 and/or the document flow 112 and may also generate data for a set of contributors. The contributors network processor 154 may then apply one or more transformation rules to the generated data for the set of contributors using the transformation module 156 (as further explained herein below) to generate data for the list of contributors 130. In this regard, the generated contributor data set may be customized to the user 102 and match the user's data access authorization and the currently active screen of the application 110, from which the retrieval of data from the contributors network U/I 120 was initiated. The transformation result (i.e., the data for the list of contributors 130) may be communicated to the embedded U/I 120 to so that a tailored contributors network view may be displayed to the user 102 (e.g., on a display of the computer 118).

Figure 2:
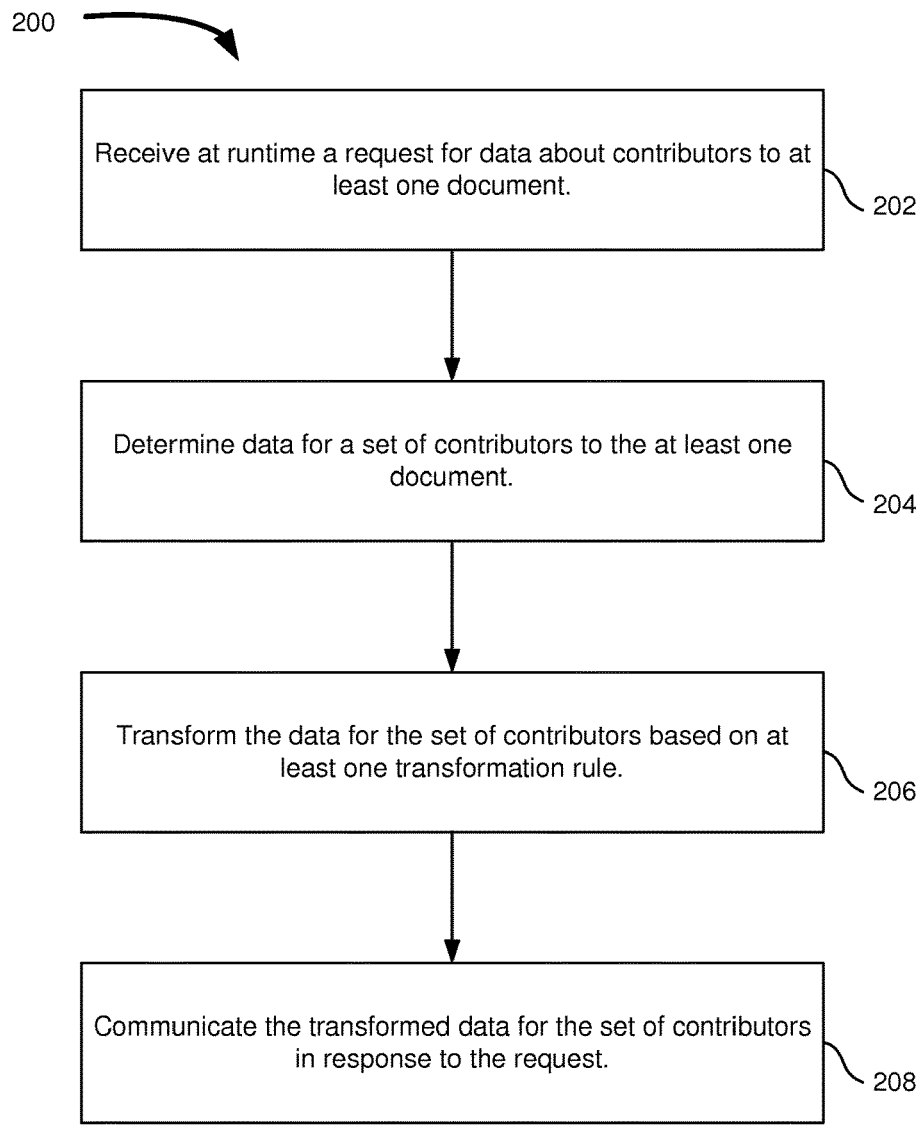
FIG. 2 is a flowchart for processing data in an application platform, in accordance with an example embodiment of the disclosure.

Example 3—Exemplary Method for Transforming Document Flow to Contributors Network FIG. 2 is a flowchart for processing data in an application platform, in accordance with an example embodiment of the disclosure. Referring to FIGS. 1-2, the example method 200 may start at 202, when a request for data about contributors to at least one document may be received at runtime. For example, the application processor 152 in the backend system 150 may receive the data request 140 for data in the contributors network (e.g., contributors to one or more of the documents 114, . . . , 116 of the document flow 112, where the documents are associated with a currently active screen or document of the application 110). The data request 140 may be initiated by the application 110 upon actuation of a feature of the user interface 120 by the user 102, or may be initiated by the application at some other time (e.g., periodically, or in response to a service request from another application). The feature of the user interface 120 may be displayed on each page of the application when a document is displayed. For example, the feature of the user interface 120 may be implemented as a software button appearing near a document displayed on the screen of the computer 118. Alternatively, the feature of the user interface 120 may be implemented with "hover over" activation, and the feature may be activated (triggering sending of the data request 140) when the user 102 hovers over (e.g., using a mouse coupled to the computer 118) the displayed button. In yet another implementation, the user interface 120 may include a selection box (e.g., a check box) allowing for the user to activate a data request for the page by checking the selection box. After the user activates similar selection boxes from several pages, a data request may be sent to request contributors data associated with the selected pages or with one or more data flows the selected documents belong to.

The context data 142 may include information identifying the user 102 (e.g., user's login credentials to use application 110), information identifying one or more screens (or one or more documents displayed on the screens) that the user has activated a feature of the user interface 120, and/or one or more data flows identified by the user or selected automatically based on the At 204, data for a set of contributors to the at least one document may be determined. For example, the contributors network processor may retrieve one or more of the documents 114, . . . , 116 from the database 158 and/or the memory 159 based on the context data 142 associated with the request 140. The contributors network processor 154 may then analyze the retrieved documents (e.g., one or more semantic portions of the documents) and determine data for a set of contributors associated with the documents. Alternatively, the contributors network processor 154 may determine data for the set of contributors by retrieving (e.g., from the database 158 or the memory 159) a superset of contributors maintained in the system 100. Additionally, the superset may be retrieved by specifying a certain data range and including contributors that have been active (e.g., have contributed to a document) during the specified period.

At 206, the data for the set of contributors may be transformed based on at least one transformation rule. For example, information about the determined set of contributors may be transformed by the transformation module 156 using one or more transformation rules (e.g., transformation rules based on a user profile, as explained herein below). The transformation(s) can include role substitution according to a mapping rule, filtering according to a filtering criterion, enrichment with additional data and/or another operation to customize the information about the determined set of contributors to the user's access privileges to contributor information, the user's position in an organization, and/or user criteria on specific requested type of contributors (e.g., only designated contact persons, only "bill to" contacts, and so forth).

At 208, the transformed data for the set of contributors may be communicated in response to the request. For example, the backend system 150 may communicate the transformed set of contributors to the application 110 as data for the list of contributors 130. The list of contributors 130 may be calculated in real time and displayed in a pop-up window near the activated feature of the user interface 130. Alternatively, the list of contributors 130 may be displayed temporarily, only when the "hover over" feature of the user interface 120 is activated. Furthermore, the list of contributors may be set to be automatically communicated to a designated email of the user or automatically printed to a printer coupled to the computer 118.

Figure 3:
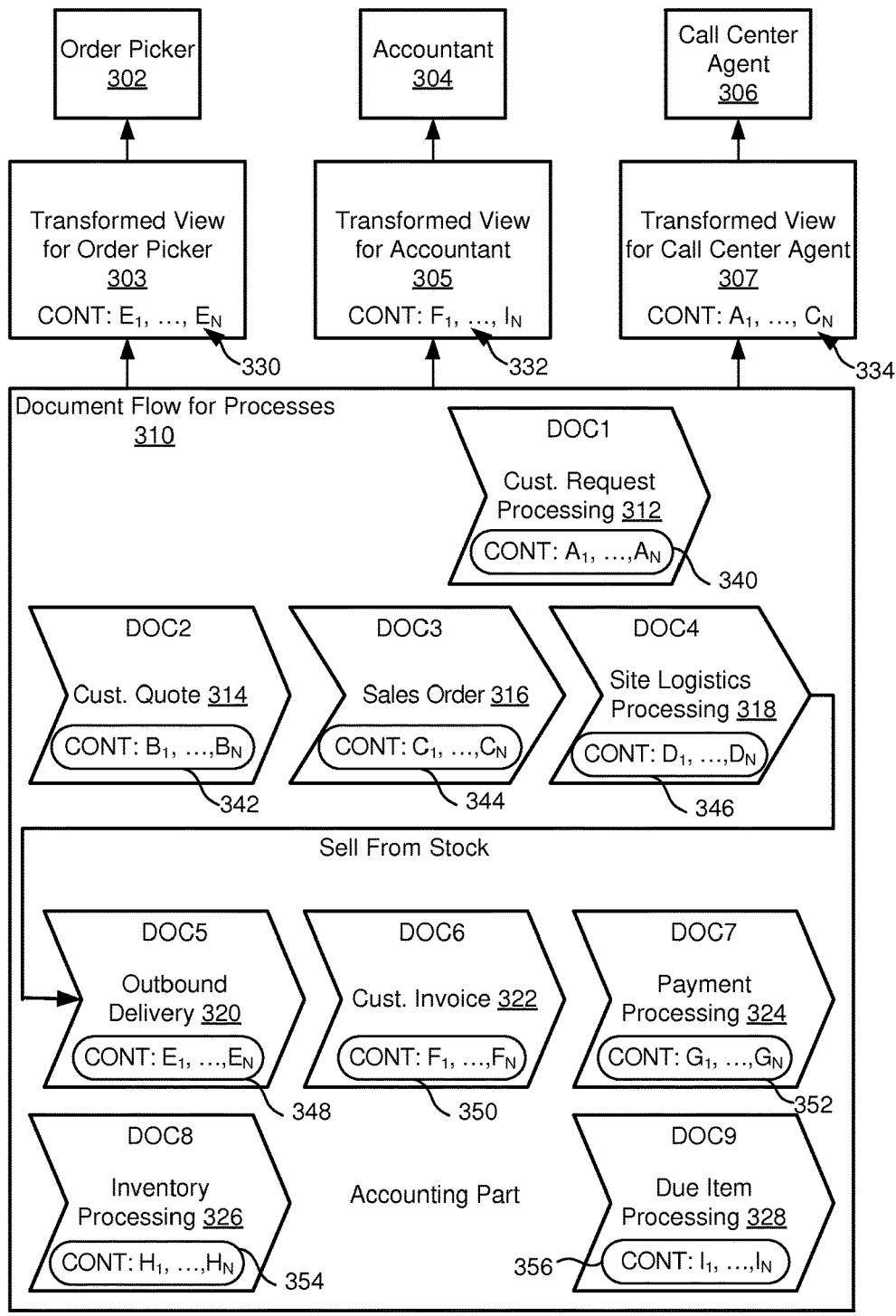
FIG. 3 is a block diagram of example transformation of a document flow to generate various contributor network views, in accordance with an example embodiment of the disclosure.

Example 4—Exemplary Document Flow and Contributors Network Views for Different Users FIG. 3 is a block diagram of example transformation of a document flow to generate various contributor network views, in accordance with an example embodiment of the disclosure. Referring to FIG. 3, there is illustrated an example document flow 310, which may be associated with a plurality of documents 312, . . . , 328. More specifically, the document flow 310 may include a customer request processing document 312, a customer quote document 314, a sales order document 316, a site logistics processing document 318, an outbound delivery document 320, a customer invoice document 322, a payment processing document 324, an inventory processing document 326, and a due item processing 328.

Each of the documents 312, . . . , 328 may include semantic information, such as "sold to party" information, "ship to party" information, "bill to party" information, "responsible employee" information, "sales representative" information, "contact person" information, "created by" information, "edited by" information, "project administrator" information, and/or "project manager" information. The semantic information in each document may further specify one or more contributors. For example, semantic information for documents 312, . . . , 328 may specify contributor information 340, . . . , 356, respectively.

In reference to FIG. 1, the user 102 may be a user with a certain security clearance and document access privileges with regard to documents 312, . . . , 328 in the document flow 310. For example, in instances when the user 102 is an order picker 302, the user may be allowed access only to documents relevant to an order picker, such as only the outbound delivery document 320. In this regard, the contributors network processor 154 in the backend system 150 may initially retrieve data for the entire set of contributors 340, . . . , 356 from all documents 312, . . . , 328. The transformation module 156, however, may transform and filter that data for the set of contributors so that only data for contributors 348 ($E_1, \ldots, E_N$) remain as data for the contributors that are relevant to the order picker 302 (and the only data for contributors that the order picker 302 may be allowed access to). The filtered/transformed data for the set of contributors may be communicated back to the user application 110 as the data for the list of contributors 130, and may be displayed to the order picker 302 as the transformed view 303 including data for part of a contributors network 330 (including contributors $E_1, \ldots, E_N$).

Similarly, in instances when the user 102 is an accountant 304, the user may be allowed access only to documents relevant to an accountant, such as only documents 322, . . . , 328. The contributors network processor 154 in the backend system 150 may initially retrieve data for the entire set of contributors 340, . . . , 356 from all documents 312, . . . , 328. The transformation module 156 may then transform and filter that data for the set of contributors so that only data for contributors 350, . . . , 356 ($F_1, \ldots, I_N$) remain as the data for contributors that are relevant to the accountant 304 (and the only data for contributors that the accountant 304 may be allowed access to). The filtered/transformed data for the set of contributors may be communicated back to the user application 110 as the data for the list of contributors 130, and may be displayed to the accountant 304 as the transformed view 305 including data for part of a contributors network 332 (including contributors $F_1, \ldots, I_N$).

In instances when the user 102 is a call center agent 306, the user may be allowed access only to documents relevant to a call center agent, such as only documents 312, . . . , 316. The contributors network processor 154 in the backend system 150 may initially retrieve data for the entire set of contributors 340, . . . , 356 from all documents 312, . . . , 328. The transformation module 156 may then transform and filter that data for the set of contributors so that only data for contributors 340, . . . , 344 ($A_1, \ldots, C_N$) remain as the data for contributors that are relevant to the call center agent 306 (and the only data for contributors that the call center agent 306 may be allowed access to). The filtered/transformed data for the set of contributors may be communicated back to the user application 110 as the data for the list of contributors 130, and may be displayed to the call center agent 306 as the transformed view 307 including data for part of a contributors network 334 (including contributors $A_1, \ldots, C_N$).

Figure 4:
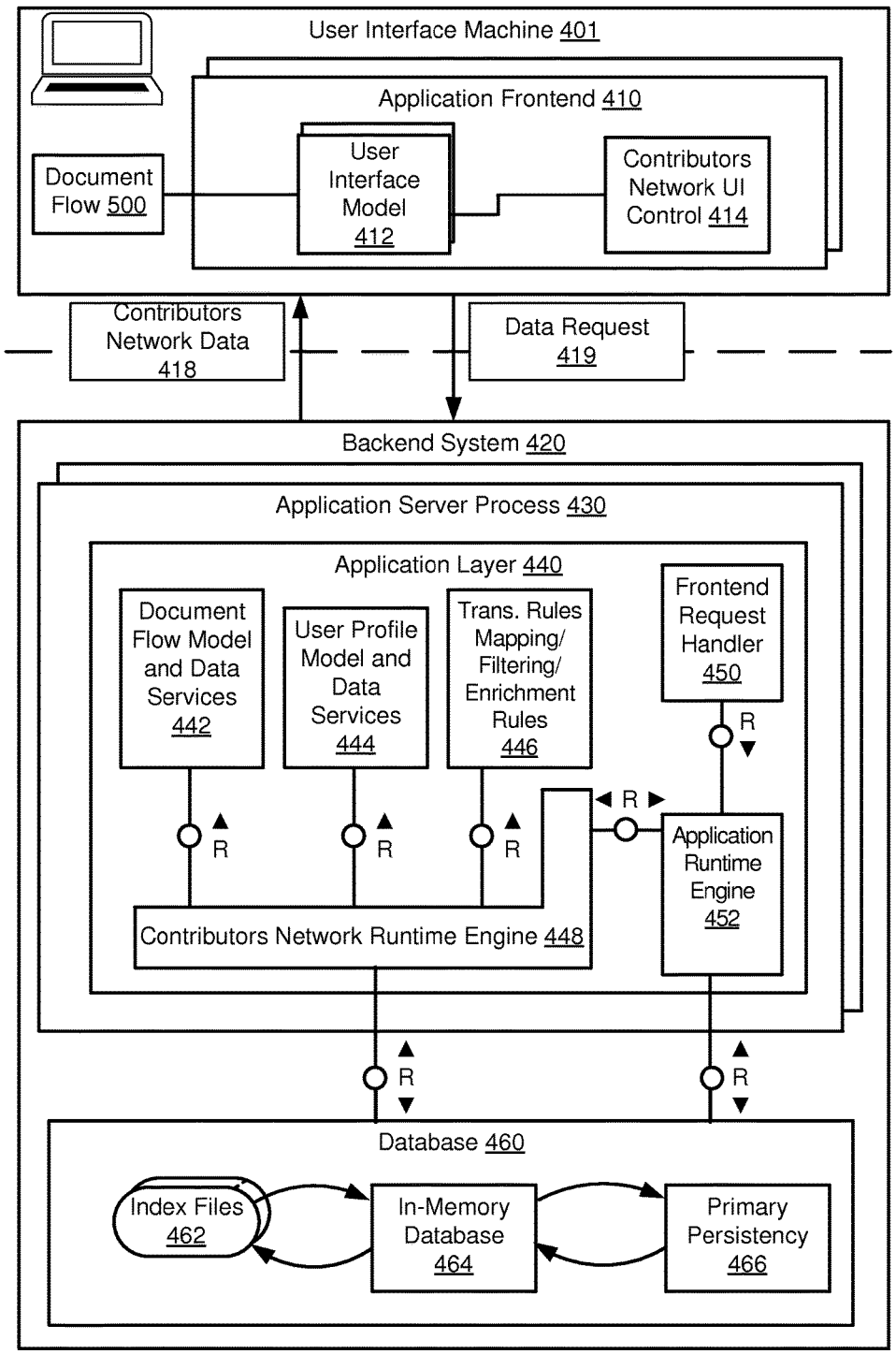
FIG. 4 is a block diagram of an example system for processing data in an application platform and generating a contributor view using a document flow, in accordance with an example embodiment of the disclosure.
Figure 5:
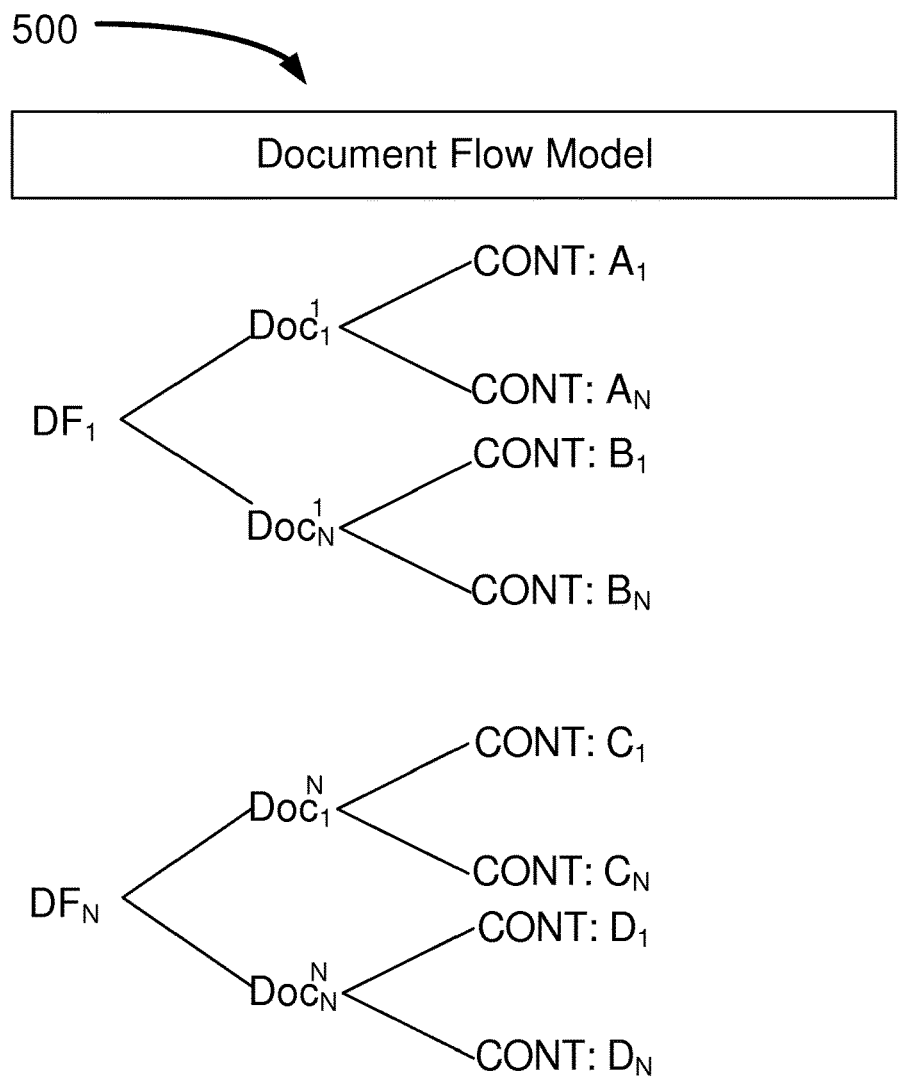
FIG. 5 is a diagram of a document flow with associated contributors, which may be used in an example embodiment of the disclosure.

Example 5—Exemplary System for Transforming Document Flow to Contributors Network FIG. 4 is a block diagram of an example system for processing data in an application platform and generating a contributor view using a document flow, in accordance with an example embodiment of the disclosure. Referring to FIG. 4, the example system 400 may comprise a user interface machine 401, which may include an application frontend 410 (running an online analytical processing application and/or another data processing application). The application frontend 410 may further include a U/I model 412 and a contributors network U/I control 414. The frontend contributors network U/I control 414 may be a U/I control, which can be embedded in one or more screens of at least one application running on the application frontend 410. The at least one application may be associated with one or more documents that are part of a document flow 500 (as illustrated in FIG. 5).

The user interface machine 401 may be coupled to a backend system 420 running an application server process 430. The application server process 430 may comprise an application layer 440, which may be used for processing requests from the application frontend 410. The application layer 440 may comprise a frontend request handler 450, an application runtime engine 452, and a contributors network runtime engine 448. The contributors network runtime engine 448 may comprise (or be coupled with) document flow model and data services module 442, user profile model and data services module 444, and transformation rules module 446. The application server process 430 may be coupled to database 460, which may include index files 462, in-memory database 464, and primary persistency 466 (e.g., primary database). The in-memory database 464 may be part of on-chip memory and may be implemented separately from the database 460.

The application runtime engine 452 may comprise suitable circuitry, logic, and/or code and may be operable to process application-related requests (e.g., core service invocations) received from the application frontend 410. For example, user interface models (e.g., as triggered by core service invocations) may be processed, and data may be read from (or stored to) the database 460 by creating, updating, and/or reading documents (such as one or more documents in the document flow 500) or records for documents. Additional requests for data (e.g., 419) initiated by the contributors network U/I control 414 may be received by the frontend request handler 450, passed on to the application runtime engine 452, where the request may be pre-processed (e.g. enriched with context data about user, user session, running applications, running screen, etc.), and dispatched to the contributors network runtime engine 448. Such context data may be communicated to the backend system 420 with the request initiated by U/I control 414. Or, in some instances, the context data may be retrieved from the database 460 and/or the user profile module 444 based on user identification information received with the data request 419 from the application frontend 410.

The contributors network runtime engine 448 may comprise suitable circuitry, logic, and/or code and may be operable to process a data request 419 for information about one or more contributors associated with at least one document in the document flow 500. The contributors network runtime engine 448 also interacts with and coordinates the components 442, 444, 446 in order to process requests (e.g., 419) that are initiated by the U/I control 414. In this regard, the application server process 430 is operable to handle the data requests and transform data about contributors on the fly (e.g., in real time), without any need to define and/or calculate the contributors network views for various documents in the document flow 500 in advance.

Additionally, even though modules 442, 444, and 446 are illustrated as separate modules, in some instances these modules may be implemented as part of the contributors network runtime engine 448. Any of the functionalities performed by modules 442, 444, and 446 may be performed at least in part by the corresponding module and/or by the contributors network runtime engine 448.

The document flow model and data services module 442 may comprise suitable circuitry, logic, and/or code and may be operable to provide metadata and/or data needed by the contributors network runtime engine 448 to determine and to extract document flow data. Additionally, based on the provided metadata (e.g., business documents models retrieved from the database 460 based on information about currently running application received with the data request 419) and/or information about the document flow 500 associated with the currently running application, the maximal set of contributors network, or contributors "superset" (e.g., all contributors to a document flow), may be derived by the module 442.

For example, FIG. 5 illustrates an example document flow 500. The data request 419 may include context data 142, which may include information specific to the user of the machine 401 (e.g., user identification information, security clearance and data access restrictions, and so forth) and/or information identifying the application running on the application frontend 410. The context data may further identify a currently active screen of the application, one or more documents that are associated with the currently active screen (e.g., one or more of the documents $DOC^1_1, \ldots, DOC^N_N$), and/or one or more document flows (e.g., corresponding document flows $DF_1, \ldots, DF_N$). After a document associated with the currently running application is identified, the remaining documents and the corresponding document flow (as shown in FIG. 5) may be identified and retrieved from the in-memory database 464 and/or the primary persistency database 466. For each of the documents in the determined document flow, one or more contributors may be determined (e.g., one or more of the contributors $A_1, \ldots, D_N$ in FIG. 5). More specifically, the module 442 may extract the contributor information from a document's semantic information, which may include one or more of "sold to party" information, "ship to party" information, "bill to party" information, "responsible employee" information, "sales representative" information, "contact person" information, "created by" information, "edited by" information, "project administrator" information, and/or "project manager" information.

The user profile model and data services module 444 may comprise suitable circuitry, logic, and/or code and may be operable to retrieve user profile information associated with the user of the machine 401, based on, for example, user identification information (e.g., user's login credentials received as part of the context information in the data request 419). A sample user profile model is illustrated in FIG. 6.

Figure 6:
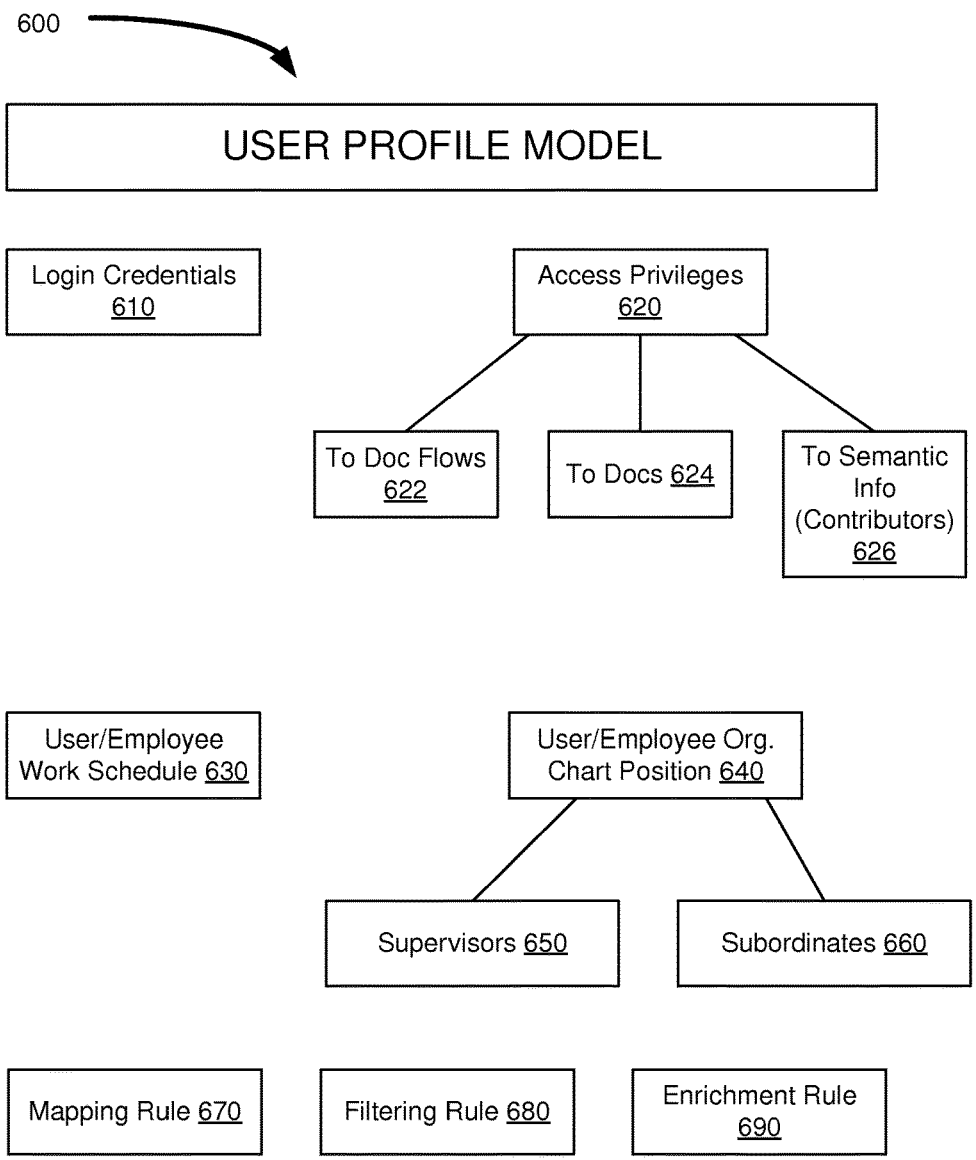
FIG. 6 is a diagram of a user profile, which may be used in an example embodiment of the disclosure.

FIG. 6 is a diagram of a user profile, which may be used in an example embodiment of the disclosure. Referring to FIG. 6, the user profile 600 may include login credentials 610, access privileges information 620, work schedule information 630, and user's organization position 640.

The login credentials 610 may comprise information used by the user to log into the application frontend 410. The login credentials 610 may be used by the module 444 to retrieve the profile 600 by matching the credentials 610 with the credentials received as part of the data request 419.

The access privileges information 620 may comprise, for example, access privileges 624 for documents, access privileges 622 for document flows, and access privileges 626 for contributor information. The access privileges information may be used during the filtering of the contributors superset by the transformation rules module 446.

The work schedule information 630 and the user's organization position 640 (which may include information identifying supervisors 650 and subordinates 660) may be used during the mapping functionalities performed by the transformation rules module 446.

The user profile information 600 and the contributors superset (identified by module 442) may be passed along to the contributors network runtime engine 448 for further processing using, for example, the transformation rules module 446. The user profile information 600 (or other context data) may be used by the transformation rules module 446 to determine one or more transformation rules to apply to the contributors superset so as to transform and customize the superset to a contributors network view that matches the end user's needs and authorizations. For example, based on the end user's assigned role or position in an organization (e.g., 640), current user session and/or currently active/running application screen, a transformation rules set may be determined and applied by the module 446. In some instances, user profile information for one or more of the contributors in the contributors superset may also be communicated to the contributors network runtime engine 448 (e.g., for purposes of executing mapping rules based on user profile information of one or more of the contributors in the superset).

The transformation rules module 446 may comprise suitable circuitry, logic, and/or code and may be operable to provide the contributors network runtime engine 448 with one or more transformation rules that may be used to customize the contributors superset. The transformation rules may be defined at system configuration time, and may include mapping rules, filtering rules, and enrichment rules.

The mapping rules may be used to replace a person (e.g., a contributor) linked to one or more business documents with another person (e.g., contributor) based on a rule. For example, if the user profile information for a certain contributor indicates that the contributor was a temporary employee who is no longer employed, then such employee would be replaced with the employee's supervisor or a designated contact person who appears in the user profile. In another instance, a contributor may be working (and is available for contact) only during a certain shift. If currently such employee is not at his work shift, then information about another employee (e.g., a supervisor who is currently available) may be substituted for the unavailable employee.

The filtering rules may be used to filter and reduce (or customize) the contributors superset so as to focus on information that may assist the end user in accordance with his organizational role/position or with the application that the request 419 was invoked from. In this regard, contributors for documents from branches of a document flow instance (e.g., 500) that are not relevant for the application the end user is using may be removed from the contributors superset (e.g., as illustrated in FIG. 3, where the contributors superset is customized and filtered according to the functions and access permissions of the various users 302-306).

The enrichment rules may be defined in order to supplement the contributors network view with additional information that can be linked to the view or to the contributors. Enrichment information may be related to, for example, master data (e.g., for a contributor in the filtered contributors superset, additional contact data may be provided and shown in the views (e.g., 303-307), such as phone number, mobile number, substitute contributor, direct manager, designated contact person for a given document, and so forth).

In an example embodiment, the mapping rules, filtering rules, and enrichment rules may be part of the user profile 600 (e.g., as rules 670, 680, and 690, respectively). Alternatively, the mapping rules, filtering rules, and/or enrichment rules are stored in the database 460 or another location accessible to the backend system 420.

After application of all transformation rules (670-690) by the contributors network runtime engine 448, the finalized data for the set of contributors may be communicated as contributors network data 418 back to the application frontend 410 for display to the end user.

Figure 7:
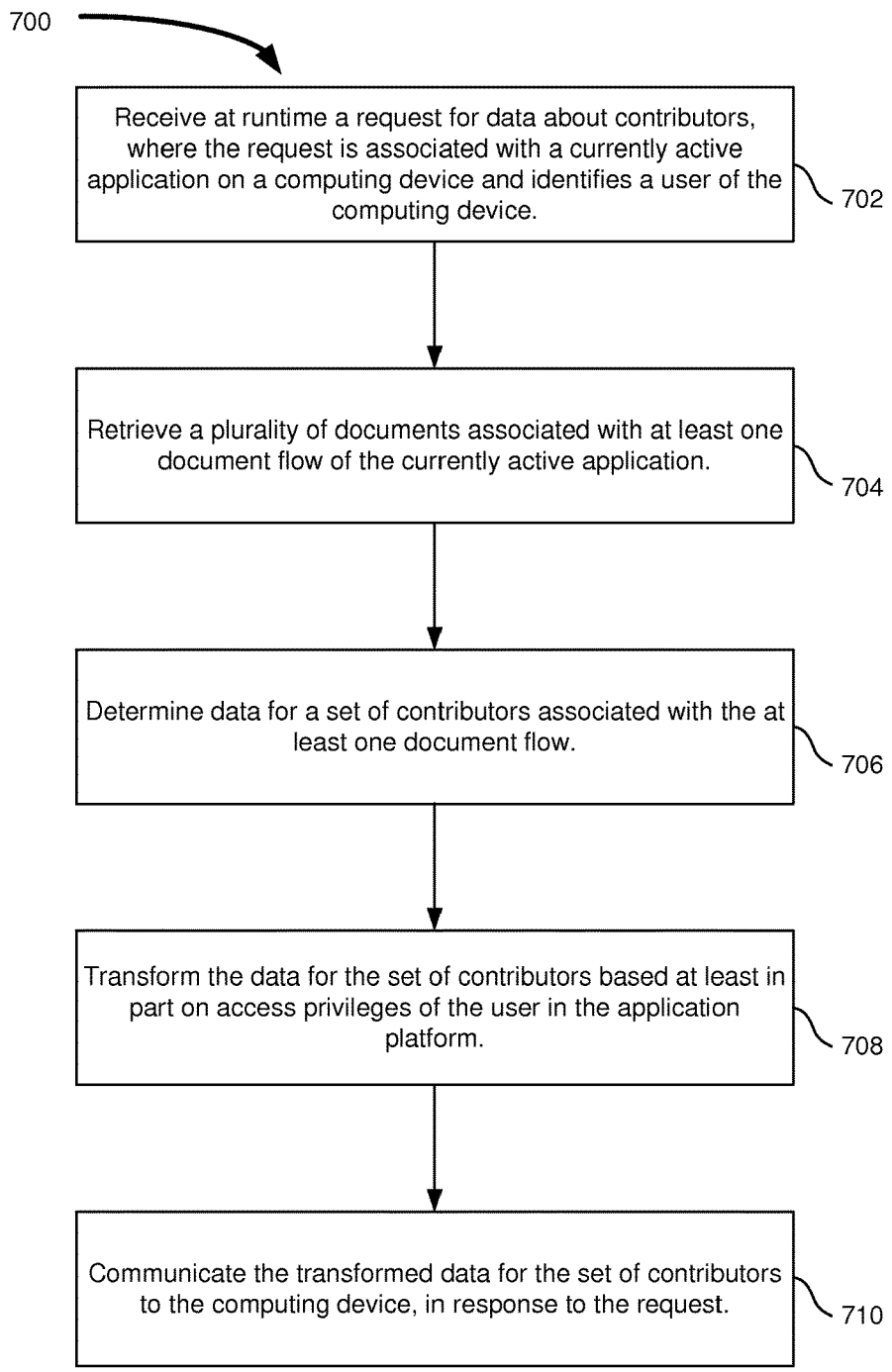
FIGS. 7-8 are flowcharts of example methods for processing data in an application platform, in accordance with an example embodiment of the disclosure.
Figure 8:
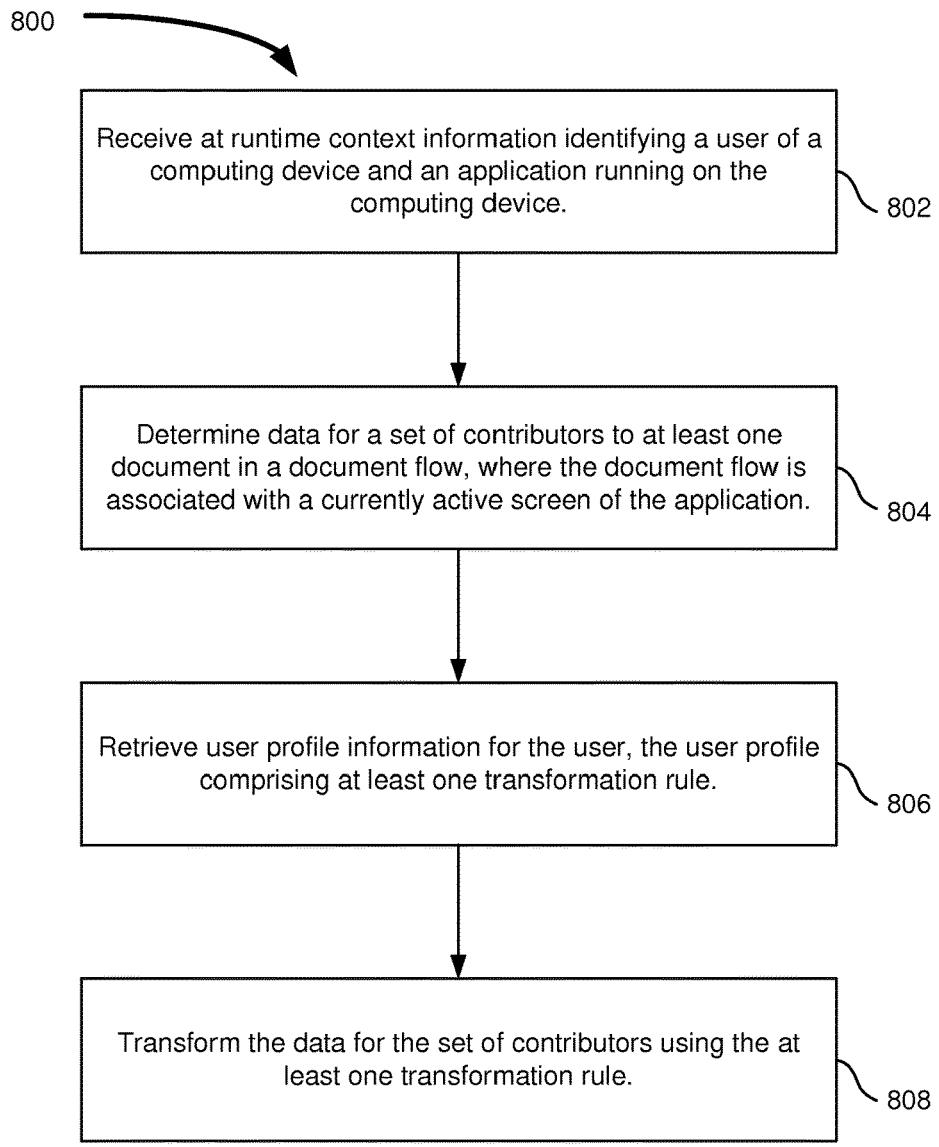

Example 6—Exemplary Methods for Transforming Document Flow to Contributors Network FIGS. 7-8 are flowcharts of example methods for processing data in an application platform, in accordance with an example embodiment of the disclosure. Referring to FIGS. 1-7, the example method 700 may start at 702 when a request for data (e.g., 140 or 419) about contributors may be received at runtime. The request may be associated with a currently active application (e.g., 110) on a computing device (e.g., 118) and may identify a user of the computing device (e.g., as part of context data 142 that is associated with user 102). At 704, a plurality of documents associated with at least one document flow of the currently active application may be retrieved. For example, the module 442 (or 154) may retrieve information about the document flow 500 (or 112).

At 706, data for a set of contributors associated with the at least one document flow may be determined. For example, the module 442 (or 154) may determine information about the contributors associated with document flow 500 (or 112). At 708, the data for the set of contributors may be transformed (e.g., using the transformation rules module 446) based at least in part on access privileges of the user in the application platform (e.g., access privileges 620 in the user profile 600). The transformed data for the set of contributors (e.g., 418) may be communicated to the computing device (e.g., 401), in response to the request (e.g., 419). The request (e.g., 419) may also identify the currently active application. In this case, the retrieving of the documents may further include identifying (e.g., by the module 442) the at least one document flow from a plurality of document flows based on the currently active application.

The determining data for the set of contributors may further include analyzing semantic data in at least one of the plurality of documents to identify the set of contributors (e.g., analyzing the documents in the document flow 500 to identify the superset of contributors). A profile (e.g., of the user of the computing device) may be retrieved (e.g., by the module 444) based at least in part on information in the request identifying the user. A profile may specify at least one of the access privileges of the user (e.g., 620), a mapping rule (e.g., 670) for substituting data for one of the contributors in the set with data for another one of the contributors in the set (e.g., mapping based on information 630-660 in the profile), a filtering rule (e.g., 680) for filtering the set of contributors (e.g., the filtering may be based at least in part on the at least one of the access privileges 620), and an enrichment rule (e.g., 690) for supplementing the data for the set of contributors with additional data on at least one of the contributors in the set. The additional data may include contact information.

The at least one of the access privileges (e.g., 620) may relate to at least one document flow (e.g., 622), at least one document (e.g., 624) in the at least one document flow, and/or information (e.g., 626) on at least one contributor associated with the at least one document. The transforming (at 708) may include substituting data for one of the contributors using a mapping rule (e.g., 670), filtering the data for the set of contributors using a filtering rule (e.g., 680), and/or supplementing the data for the set of contributors using an enrichment rule (e.g., 690).

Referring to FIG. 8, the example method 800 may start at 802, when context information (e.g., 142) identifying a user of a computing device (e.g., user 102 of device 118) and an application (e.g., 110) running on the computing device may be received at runtime (e.g., as part of request 140). At 804, data for a set of contributors to at least one document in a document flow may be determined. For example, the module 442 (or 154) may determine information about the contributors associated with document flow 500 (or 112). The document flow (e.g., 112 or 500) may be associated with a currently active screen of the application. At 806, user profile information (e.g., 600) for the user may be retrieved (e.g., by module 444). The user profile may include or specify at least one transformation rule (e.g., mapping rule 670, filtering rule 680, and/or enrichment rule 690). The data for the set of contributors may be transformed (e.g., by module 446 and/or the contributors network runtime engine 448) using the at least one transformation rule (e.g., using one or more of the rules 670-690).

Example 7—Exemplary Computing Systems

Figure 9:
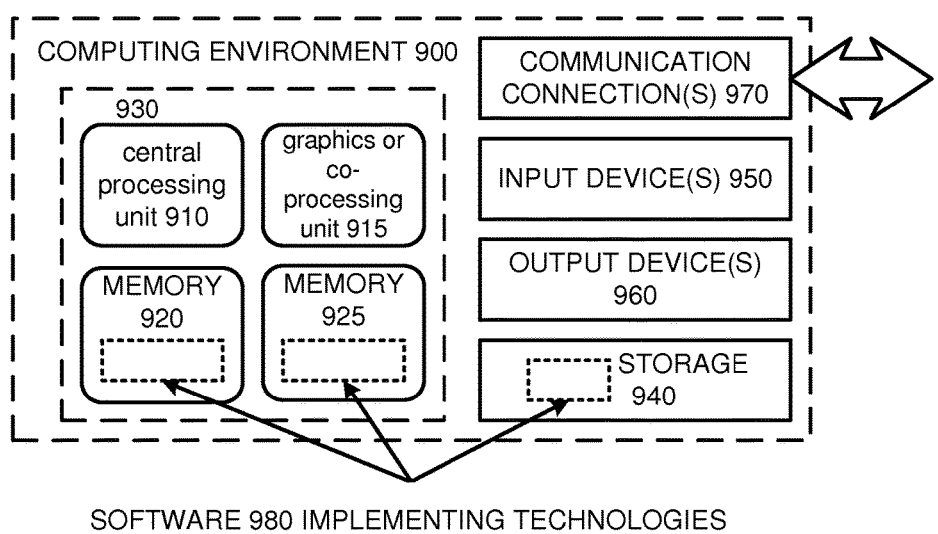
FIG. 9 is a diagram of an example computing system, in which described embodiments can be implemented.

FIG. 9 is a diagram of an example computing system, in which described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 16—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage devices, optical storage devices, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. One or more computer-readable storage devices comprising computer-executable instructions for performing a method for processing data in an application platform, the application platform comprising at least one database and at least one processor, the method comprising:

receiving at runtime a request from a currently active application on a computing device for data associated with a plurality of contributors associated with at least one identified document flow of the currently active application, wherein the request identifies a user of the computing device;

extracting a first plurality of structured data elements from each of a first plurality of documents associated with the at least one identified document flow and the plurality of contributors, wherein at least a portion of the first plurality of documents comprise different type identifiers, wherein each document type identifier is associated with attributes in the form of structured data elements, the structured data elements having types, at least a portion of the types of structured data elements differing between different document type identifiers, the structured data elements being mapped to particular values, wherein the at least one identified document flow is selected from a plurality of document flows, each document flow associated with a set of document type identifiers, at least a portion of document types in a set differing for the plurality of document flows;

determining access privileges of the user, the access privileges determining a first set of documents type identifiers;

automatically selecting a second plurality of documents from the first plurality of documents, wherein a document of the first plurality of documents is selected if a type identifier of the document matches a type identifier of the first set of document type identifiers;

selecting a second plurality of structured data elements from the second plurality of documents, the second plurality of structured data elements being fewer than the first plurality of structured data elements; and communicating at least a portion of the second plurality of structured data elements, from multiple documents of the second plurality of documents, to the computing device, in response to the request, the active application on the computing device generating a display comprising mapped values of multiple structured data elements of the second plurality of structured data elements.

2. The one or more computer-readable storage devices according to claim 1, wherein the request identifies the currently active application and the retrieving further comprises:

identifying the at least one document flow from the plurality of document flows based on the currently active application.

3. The one or more computer-readable storage devices according to claim 1, wherein extracting a first plurality of structured data elements further comprises:

analyzing semantic data in at least one of the first plurality of documents to identify at least one of the plurality of contributors.

4. The one or more computer-readable storage devices according to claim 1, the method further comprising:

retrieving a profile based at least in part on the request identifying the user, wherein the profile specifies one or more of:
at least one of the access privileges of the user;
a mapping rule for substituting data for one of the plurality of contributors with data for another one of the plurality of contributors;
a filtering rule for filtering the first plurality of structured data elements to provide the second plurality of structured data elements, the filtering based at least in part on the at least one of the access privileges; and
an enrichment rule for supplementing the second plurality of structured data elements with additional data on at least one of the plurality of contributors, wherein the additional data comprises contact information.

5. The one or more computer-readable storage devices according to claim 4, wherein the at least one of the access privileges relates to one or more of: the at least one identified document flow, at least one document type identifier in the at least one identified document flow, and information about at least one contributor associated with the at least one document flow.

6. The one or more computer-readable storage devices according to claim 4, wherein the selecting further comprises one or more of:
substituting data for one of the contributors using the mapping rule;
filtering the extracted data using the filtering rule; and
supplementing the selected second plurality of structured data elements using the enrichment rule.

7. A computer-implemented method for processing data in an application platform, the method comprising:

receiving at runtime a first request for data associated with contributors, each contributor associated with at least one identifier identifying the contributor, wherein the first request is associated with a first currently active application on a first computing device and identifies a first user of the first computing device;

retrieving a first plurality of documents associated with the contributors and at least one document flow of the first currently active application, wherein at least a portion of the first plurality of documents are of different types, each document type having a document type identifier and being associated with attributes in the form of structured data elements, at least a portion of the structured data elements differing between different document types, the structured data elements being mapped to particular values, and wherein the at least one document flow comprises a plurality of links between document types in the document flow, a link indicating a relationship between linked document types;

determining data for a set of the contributors associated with the at least one document flow, the determined data comprising data extracted from the first plurality of retrieved documents;

determining access privileges of the first user, the access privileges determining a first set of document types from which data can be retrieved for the first user;

selecting a second plurality of retrieved documents from the first plurality of retrieved documents, wherein a document of the first plurality of retrieved documents is selected if it has a type that matches a type of the first set of document types;

selecting a first plurality of datum from at least a portion of the second plurality of retrieved documents;

communicating the selected first plurality of datum to the first computing device in response to the first request, wherein the first active application on the first computing device generates a display comprising at least a portion of the selected first plurality of datum;

receiving at runtime a second request for data associated with contributors, the second request associated with a second current active application on a second computing device and identifying a second user of the second computing device;

determining access privileges of the second user, the access privileges determining a second set of document types from which data can be retrieved for the second user, at least a portion of the documents types of the first set differing from document types of the second set;

selecting a third plurality of retrieved documents from the first plurality of retrieved documents, wherein a document of the first plurality of retrieved documents is selected if it has a type that matches a type of the second set of document types;

selecting a second plurality of datum from at least a portion of the third plurality of retrieved documents; and communicating the selected second plurality of datum to the second computing device in response to the second request.

8. The method of claim 7, further comprising:

analyzing semantic information within the retrieved first plurality of documents to identify at least one contributor of the contributors.

9. The method of claim 7, further comprising:

adding data to the selected first plurality of datum based on at least one enrichment rule, the added data including contact data for at least one contributor of the set of contributors.

10. A system for processing data in an application platform, the system comprising:

a memory;

at least one database; and at least one processor, the at least one processor operable to:

receive at runtime, from a first computing device, a first request for data associated with a plurality of contributors for a first contributor of the plurality of contributors;

retrieve data contained in a first plurality of documents associated with at least one document flow, the at least one document flow being associated with the plurality of contributors, at least a portion of the documents being of different types and the at least one document flow comprising a plurality of documents types, wherein each document type has a document type identifier and is associated with a plurality of structured data elements and at least a portion of structured data elements differ between documents having different types;

determine access privileges of the first contributor, the access privileges determining a first set of document types, the first set of documents types being a first subset of document types of the at least one document flow;

select a second plurality of documents from the first plurality of documents, where a document of the first plurality of documents is selected if it is of a type included in the first set of document types;

select a first plurality of structured data elements from each of multiple documents of the second plurality of documents;

communicate the selected first plurality of structured data elements to the first computing device in response to the first request;

receive at runtime, from a second computing device, a second request for data associated with the plurality of contributors for a second contributor of the plurality of contributors;

determine access privileges of the second contributor, the access privileges determining a second set of document types, the second set of document types being a second subset of document types of the document flow, at least a portion of the document types of the first set differing from document types of the second set;

select a third plurality of documents from the first plurality of documents, where a document of the first plurality of documents is selected if it is of a type included in the second set of document types;

select a second plurality of structured data elements from each of multiple documents of the third plurality of documents; and communicate the selected second plurality of structured data elements to the second computing device in response to the second request.

11. The system of claim 10, the at least one processor further operable to:

analyze semantic data in at least one of the first plurality of documents to identify at least one contributor of the plurality of contributors.

12. The system of claim 10, the first computing device generating a display comprising the at least a portion of the second plurality of structured data elements.

13. The one or more computer-readable storage devices of claim 1, wherein the first plurality of structured data elements are maintained in a database.

14. The one or more computer-readable storage devices of claim 13, wherein the determining and the selecting a second plurality of structured data elements comprises executing a database query.

* * * * *